3,528,790
RESIN BONDED ALUMINUM OXIDE ABRASIVE
PRODUCTS HAVING IMPROVED STRENGTH
John Hay, Shrewsbury, and Harold J. Kenneway, Brookfield, Mass., assignors to Norton Company, Worcester, Mass., a corporation of Massachusetts
No Drawing. Filed Feb. 20, 1968, Ser. No. 706,794
Int. Cl. C08g 51/12; B24b 1/00
U.S. Cl. 51—298            6 Claims

ABSTRACT OF THE DISCLOSURE

Improved bonding of aluminum oxide grain with phenolic resins by:
(a) Mixing aluminum oxide abrasive grains with an aqueous solution of nickel nitrate having a concentration which contains up to about 2% nickel by weight of the aluminum oxide;
(b) Drying the mixture with agitation whereby the abrasive is coated with the nickel nitrate;
(c) Firing the treated abrasive at about 1200° C. for about 24 hours to form nickel oxide by decomposition of the nitrate and a diffused nickel alumina spinel coating on the abrasive grains;
(d) Partially reducing the spinel coating under a hydrogen atmosphere for about 3 hours at about 1000° C.
Alternatively, the fused alumina grain may be directly treated in hydrogen without precoating with nickel salt.

BACKGROUND OF THE INVENTION

The field of the invention is abrasive tool making processes, materials and compositions using synthetic resin binders.

The prior art bonded-abrasive products and the variables involved in the manufacture thereof are disclosed in Kirk-Othmer, "Encyclopedia of Chemical Technology," second edition, volume 1, particularly pages 31 to 36. The aluminum oxide abrasive materials useful in the prior art and the present invention are disclosed in Kirk-Othmer, ibid., volume 1, page 27, and volume 2, page 56.

The combination of aluminum oxide with nickel to form cermet tool bodies containing the nickel spinel of alumina is disclosed in U.S. Pat. No. 2,961,325 of Mayfield. A subsequent advancement in the art of producing cermet tool bodies of nickel alumina is described in U.S. Pat. No. 3,192,042 of Spacil, wherein aluminum oxide is mixed with nickel halide dissolved in a non-aqueous solvent, the mixture is dried and the halide is reduced to metallic nickel.

SUMMARY OF THE INVENTION

According to the concept of the present invention, an improved bond strength is achieved between the abrasive grains and the organic resin by exposing the abrasive grains at elevated temperatures to a reducing atmosphere.

Bonded abrasive products such as grinding wheels and refractory articles such as filter media have been found to have improved strength after prolonged exposure to water after the abrasive grains have been treated according to the embodiments of the present invention.

The aluminum oxide abrasive grains are, according to one embodiment of the present invention, heated at about 1000° C. for about 3 hours under an atmosphere of hydrogen.

In another embodiment of the present invention, the surfaces of the aluminum oxide abrasive grains are coated with nickel nitrate. The nickel nitrate is oxidized and the grains are heated to produce a diffused nickel alumina spinel coating on the abrasive grains. Finally the grain is heated at approximately 1000° C. for about 3 hours under an atmosphere of hydrogen.

The abrasive grains are then bonded and formed into bonded-abrasive products as disclosed in Kirk-Othmer, ibid., volume 1, pages 34 and 35.

DESCRIPTION OF THE PREFERRED EMBODIMENTS

Without further elaboration, it is believed that one skilled in the art can, using the preceding description, utilize the present invention to its fullest extent.

EXAMPLE 1

Treatment of the abrasive

Aluminum oxide abrasive having a 46 grit grain size is treated by heating the abrasive under a hydrogen atmosphere at 1000° C. for 3 hours.

Preparation of epoxy resin bond

The bond is prepared by mixing the following ingredients having the weights indicated:

Dicyclo pentadiene dioxide-endo isomer, lbs. _____ 0.23
Maleic anhydride, lbs. _____ 0.13
Trimethylol ethane, g. _____ 18.0
Cryolite, g. _____ 29.0
$\frac{1}{16}''$ glass fibers, g. _____ 7.5

Preparation of bonded-abrasive product 4.53 lbs. of the treated aluminum oxide abrasive are mixed with 0.47 lb. of the epoxy resin bond and the mixture is compressed in a mold at a pressure of 3 tons per square inch.

As a standard for comparison, 4.53 lbs. of untreated aluminum oxide abrasive are mixed with 0.47 lb. of the epoxy resin bond and the mixture is compressed in a mold at a pressure of 3 tons per square inch.

Curing the bonded-abrasive product

The resin in the bonded-abrasive products is cured by heating under controlled conditions with an increase in the temperature from 80° C. to 230° C. over a period of 21 hours.

Evaluation of bonded-abrasive products

The modulus of rupture recorded in pounds per square inch measured at 300° C. for each of the bonded-abrasive products is as follows:

Hydrogen treated _____ 200
Not hydrogen treated _____ 56
Percent gain in strength _____ 256

EXAMPLE II

Treatment of the abrasive

Aluminum oxide abrasive having a 46 grain size is mixed with an aqueous solution of nickel nitrate. Five batches are prepared and varying amounts of nickel nitrate are added to produce, upon drying, abrasive grain having 0.2, 0.5, 1.0, 1.5 and 2.0% nickel added as nitrate.

The mixtures are heated to evaporate the water, using occasional mixing to ensure uniform distribution of the nickel salt. The dry mixtures are then fired in an oxidizing atmosphere at 1200° C. for 24 hours and the nickel oxide formed by decomposition of the nitrate is diffused into the aluminum oxide grains to form nickel alumina spinel of the formula $NiO \cdot Al_2O_3$.

The fired abrasive grains with spinel diffused therein are heated at 1000° C. for 3 hours under a hydrogen atmosphere and the spinel is either totally or partially reduced to produce aluminum oxide grains having metallic nickel dispersed therein.

Indications of the degree of nickel reduction achieved by hydrogen treatment are provided by the following table in which a comparison is made between the amount of nickel added to the grain as nitrate and the quantity of metal susceptible to being extracted by acid treatment after reduction in hydrogen:

| Percent nickel added as nitrate | Percent nickel in reduced grain soluble in 1:1 $HNO_3$ |
|---|---|
| 0.2 | 0.26 |
| 0.5 | 0.37 |
| 1.0 | 0.56 |
| 1.5 | 0.87 |
| 2.0 | 1.10 |

The procedures of Example I are followed for the preparation of the resin bond, the bonded-abrasive products and the cure.

Evaluation of the bonded-abrasive products

The modulus of rupture recorded in pounds per square inch measured at 300° C. for each of the 5 batches resulting in bonded-abrasive products is as follows where the untreated bonded abrasive product of Example I is used as the standard:

| Percent nickel added to aluminum oxide | Modulus of rupture | Percent gain in strength |
|---|---|---|
| 0.2 | 100 | 78 |
| 0.5 | 158 | 182 |
| 1.0 | 167 | 198 |
| 1.5 | 172 | 206 |
| 2.0 | 155 | 176 |

EXAMPLE III

Treatment of the abrasive

Aluminum oxide abrasive is treated as in Example I.

Preparation of phenolic resin bond

The bond is prepared by combining the following raw materials:

|  | Percent |
|---|---|
| Two-stage phenolic resin (powdered novolak with 9% hexamethylene tetramine) | 85.4 |
| Cryolite | 12.7 |
| Calcium oxide | 1.9 |

Preparation of the bonded-abrasive products

Using 8.9% of the above bond and 91.1% of the treated aluminum oxide abrasive grain, a mixture is prepared and compressed in a mold at 2½ tons per square inch.

As a standard for comparison 91.1% of untreated aluminum oxide abrasive grain is mixed with 8.9% of the phenolic bond and the mixture is compressed in a mold at 2½ tons per square inch.

Curing the bonded-abrasive products

The resin in the bonded-abrasive products is cured by heating under controlled conditions with an increase in temperature to 175° C. over a period of 17 hours.

Evaluation of the bonded-abrasive products

Modulus of rupture measurements are made on the cured bonded-abrasive products before immersion in water and after soaking in water for 10 days at 25° C. The results are as follows:

|  | Modulus of rupture, p.s.i. | | Percent gain in strength | |
|---|---|---|---|---|
|  | Before water immersion | After water immersion | Before water immersion | After water immersion |
| Untreated | 172 | 96 | | |
| Treated with hydrogen | 200 | 128 | 16.3 | 33.3 |

EXAMPLE IV

Treatment of the abrasive

Aluminum oxide abrasive having a 46 grain size is mixed with an aqueous solution of nickel nitrate of sufficient strength to produce 2.0% nickel added as nitrate, and the mixture is heated to evaporate the water, using occasional mixing to ensure uniform distribution of the nickel salt.

The dry mixture is then fired in an oxidizing atmosphere at 1200° C. for 24 hours and the nickel oxide formed by decomposition of the nitrate is diffused into the aluminum oxide grains to form nickel alumina spinel of the formula $NiO.Al_2O_3$.

The fired abrasive grain with spinel diffused therein is heated at 1000° C. for 3 hours under a hydrogen atmosphere and the spinel is either totally or partially reduced to produce aluminum oxide grains having metallic nickel dispersed therein.

The procedures of Example III are followed for the preparation of the phenolic resin bond, the bonded-abrasive product and the cure.

Evaluation of the bonded-abrasive product

Modulus of rupture measurements are made on the cured bonded-abrasive products before immersion in water and after soaking in water for 10 days at 25° C. The results are as follows:

|  | Modulus of rupture, p.s.i. | | Percent gain in strength | |
|---|---|---|---|---|
|  | Before water immersion | After water immersion | Before water immersion | After water immersion |
| Untreated | 172 | 96 | | |
| Treated with 2% nickel | 200 | 177 | 16.3 | 84.0 |

The preceding examples can be repeated with similar success by substituting other epoxy (such as linear type epoxies and epoxy novolacs) and other phenolic type resins such as resole types and modified phenolics.

The abrasive grain employed in the preceding examples was a fused alpha alumina made from bauxite fusion having the following average analysis:

| Component: | Wt. percent |
|---|---|
| $SiO_2$ | 1.65 |
| $Fe_2O_3$ | 0.20 |
| $TiO_2$ | 3.15 |
| $ZrO_2$ | 0.20 |
| CaO | <0.10 |
| MgO | 0.40 |

In the following examples a purified alumina was fused to give a product having an average analysis:

| Component: | Wt. percent |
|---|---|
| $SiO_2$ | 0.5–0.1 |
| $Fe_2O_3$ | 0.15–0.25 |
| $TiO_2$ | 0.01–0.05 |
| S | 0.002–0.005 |
| $Na_2O$ | 0.4–0.5 |
| CaO, MgO | Trace |

Bonded specimens were prepared using the phenolic resin composition and resin-grain proportions described above. The strength of specimens after curing and after soaking in water for 10 days at 25° C. were as follows:

| Type of grain | Modulus of rupture (p.s.i.) | | Percent change in strength over untreated grain | |
|---|---|---|---|---|
| | As cured | 10 days H$_2$O 25° C. | As cured | 10 days H$_2$O |
| Untreated grit | 166 | 55 | | |
| Grit H$_2$ treated | 180 | 58 | +8.4 | +5.5 |
| Grit 0.2% NiH$_2$ treated | 227 | 145 | +36.7 | +163.6 |
| Grit 0.5% NiH$_2$ treated | 231 | 154 | +39.2 | +180.0 |
| Grit 1.0% NiH$_2$ treated | 193 | 133 | +16.3 | +141.8 |
| Grit 1.5% NiH$_2$ treated | 163 | 102 | −1.8 | +85.5 |
| Grit 2.0% NiH$_2$ treated | 128 | 89 | −22.9 | +62.0 |

The results indicate that under the experimental conditions used, 0.5% nickel is the optimum amount as far as cured strength is concerned. Although nickel contents in excess of this caused the cured strengths to decrease, the strengths after soaking in water still remained substantially greater than that of standard grain. After 10 days in waer, standard grain specimens retained only 33% of their original strength, whereas nickel treated samples retained 63–69%.

Hydrogen treatment of the high purity alumina without introduction of nickel is effective in improving bond strength. Results with lower purity, fused bauxite type alumina were more outstanding. This suggests that reduction of oxide impurities in the lower purity type alumina is promoting the bonding to a greater degree than is the formation of oxygen deficient alumina.

What is claimed is:

1. A process for manufacturing an organic bonded-abrasive product having improved strength after prolonged exposure to water comprising:
   (a) subjecting the surfaces of aluminum oxide abrasive grains to a hydrogen atmosphere for about three hours at about 1000° C.
   (b) mixing the grains with a synthetic polymer bond selected from the group consisting of epoxy and phenol-aldehyde bonds;
   (c) compressing and shaping the mixture of bond and abrasive; and
   (d) curing the shaped mixture to form the bonded-abrasive product at temperatures from 80° C. to 230° C. up to 21 hours.

2. The process of claim 1, wherein said synthetic polymer bond is an epoxy resin and said curing is carried out at about 230° C.

3. A process for manufacturing an organic bonded-abrasive product having improved strength after prolonged exposure to water comprising:
   (a) dispersing nickel nitrate on the surface of aluminum oxide abrasive grains;
   (b) oxidizing said nickel nitrate to nickel oxide on said surface;
   (c) reducing the major portion of said nickel on said surface to elemental nickel in an amount not exceeding 2% by weight;
   (d) mixing the metallic surfaced grains with a synthetic polymer bond selected from the group consisting of epoxy resin and phenol aldehyde resin bonds;
   (e) compressing and shaping the mixture of bond and abrasive; and
   (f) curing the shaped mixture to form the bonded-abrasive product at temperatures from 80° C. to 230° C. up to 21 hours.

4. The process of claim 3, wherein said nickel nitrate is dispersed from an aqueous solution.

5. The process of claim 3, wherein said nickel oxide on said surfaces is reduced under a hydrogen atmosphere for about 3 hours at about 1000° C.

6. The process of claim 3, wherein said synthetic polymer bond is phenol aldehyde and said curing is carried out at about 175° C.

References Cited

UNITED STATES PATENTS

| | | | |
|---|---|---|---|
| 2,042,635 | 6/1936 | Schellens | 51—309 |
| 2,319,331 | 5/1943 | Kurtz | 51—309 |
| 2,404,598 | 7/1946 | Sachse | 51—309 |
| 3,216,794 | 11/1965 | Roschuk | 51—309 |
| 3,293,012 | 12/1966 | Smiley | 51—309 |
| 3,423,195 | 1/1969 | Steinberg | 51—298 |

DONALD J. ARNOLD, Primary Examiner

U. S. Cl. X.R.

51—295, 293